United States Patent [19]

Rowsell et al.

[11] Patent Number: 5,953,371
[45] Date of Patent: Sep. 14, 1999

[54] MULTIPOINT TO POINT RADIOCOMMUNICATIONS NETWORK

[75] Inventors: Francis John Rowsell; Thomas Robert Meek, both of Felixstowe, United Kingdom

[73] Assignee: Schlumberger Industries Limited, London, United Kingdom

[21] Appl. No.: 08/897,588

[22] Filed: Jul. 21, 1997

Related U.S. Application Data

[63] Continuation of application No. 08/260,942, Jun. 16, 1994, Pat. No. 5,717,718.

[30] Foreign Application Priority Data

Jun. 22, 1993 [GB] United Kingdom ................. 93128361

[51] Int. Cl.$^6$ ..................................................... H04B 1/38
[52] U.S. Cl. ......................... 375/220; 375/260; 370/480; 340/870.03
[58] Field of Search ................................. 375/201, 220, 375/260; 370/344, 468, 480, 515; 340/870.02, 870.03; 455/103

[56] References Cited

U.S. PATENT DOCUMENTS 4,799,059  1/1989  Grindahl et al. .................. 340/870.03
4,940,976  7/1990  Gastouniotis et al. ............. 340/870.02
5,278,907  1/1994  Snyder et al. ............................. 380/48
5,311,541  5/1994  Sanderford, Jr. ........................ 375/201

*Primary Examiner*—Stephen Chin
*Assistant Examiner*—Lenny Jiang
*Attorney, Agent, or Firm*—Leonard W. Pojunas

[57] ABSTRACT

A data collection system in which a number of remote terminals (RT) transmit data packets for reception by one or more fixed data collectors (FDC) or a portable data collector (PDC). Each remote terminal (RT) transmits data in two frequency sub-bands to which the fixed and portable data collectors are respectively tuned. Channel capacity is improved in at least the fixed data collector (FDC) sub-band by the use in the remote terminal of minimum shift keying (MSK) encoding and pseudo-random variation of a frequency error applied to the packet transmission frequency for successive packets. In the fixed data collectors dual fast-Fourier transform signal processing enables the interpretation of simultaneous packets with different error frequencies. The use of a single design of remote terminal (RT) in conjunction with portable data collectors (PDC) simplifies system set-up, with the portable collectors providing coverage for those areas where a fixed data collector (FDC) network has yet to be established. The system has particular application to the monitoring of devices such as gas and electricity meters and security systems.

2 Claims, 10 Drawing Sheets

MULTIPOINT TO POINT RADIOCOMMUNICATIONS NETWORK

This is a continuation of application Ser. No. 08/260,942, filed Jun. 16, 1994 which is now U.S. Pat. No. 5,717,718.

FIELD OF THE INVENTION

The present invention relates to radio communications networks which are intended primarily to collect data from many remote terminals at low cost. The invention has particular application where the remote terminals are associated with devices such as utility meters, security systems, and remote monitoring equipment of various kinds.

BACKGROUND OF THE INVENTION

A number of such systems are known and, in the United Kingdom a specific VHF frequency band with a 50 kHz channel spacing is allocated for such systems when used by utilities. FIG. 12 of the accompanying drawings schematically illustrates a typical arrangement for such a system.

A number of remote terminals RT communicate with fixed local data collectors or concentrators FDC using a radio data link. The data collected by the local concentrators is supplied to a central controller via a data network ISDN to which other local concentrators are connected, or via a radio link RL. Information collected at the central controller is then passed to customer billing and settlement departments.

A typical objective for such a system is to provide a 99% probability of radio coverage throughout the service area for a high proportion of the time. The remainder of the service area is covered by a fallback system in which meter reading data is collected manually. The network cost is dominated by the cost of the remote terminals which are required to be inexpensive. However the cost and complexity of the fixed collector infrastructure must also be minimized to enable a practical system roll-out.

An example of a multiple-point to point network, for use in the monitoring of consumer water supply meters, is described in U.S. Pat. No. 4,940,976 of Gastouniotis et al. The remote terminals of Gastouniotis are mounted on or adjacent to the casing of an existing water meter and include remote flow sensing apparatus in the form of a magnetic flux sensor which senses the varying magnetic field produced by the water meter's rotating magnet. A calculation unit converts the sensor signal into a binary count signal representative of the volume of water consumed. This binary count signal is transmitted to local fixed data collectors by a conventional low power frequency shift keyed (FSK) modulator and transmitter operating in the 72–76 MHz frequency band and having a power output of below 2 watts as required by United States FCC regulations for telemetry operations. Accumulated data from the fixed data unit is then transmitted to a central office by telephone line, CATV cable or half-duplex RF radio link.

Transmission of consumption data from remote terminal to local collector in the Gastouniotis system is in the form of a 128-bit burst (64 bits of unit identification header and 64 data bits) at 1600 bits/sec. A burst is transmitted each time the consumption meter is incremented and also periodically at a specified interval, such as once per day, determined by a timer within the remote terminal. The packet size and data rate are determined by transmission collision probability minimization such as to maximize the probability of at least one packet being successfully transmitted each day from each of 10,000 remote terminals to a single local connect. The reception area of the Gastouniotis local collectors is only about 7.8 square-kilometers (3 square miles) and the figure of 10,000 remote terminals is suggested as sufficient to achieve adequate coverage of the reception area.

The design of such networks must overcome a number of problems including the minimization of co-channel interference between neighboring remote terminals and the cost of the remote terminals. It is generally required that several thousand remote terminals be supported by each data collector. Key features in the design of a low cost remote terminal are low component count, ease of manufacture and a relaxed specification for frequency stability. As mentioned previously, the cost and complexity of the fixed collector infrastructure must also be minimized.

SUMMARY OF THE INVENTION

In accordance with the present invention there is provided a method of data collection in a multipoint to point data network having a number of fixed remote terminals, each of which periodically wirelessly transmits data packets to one or more local collectors, in which each remote terminal transmits data packets in a frequency sub-band and applies a pseudo-random frequency error to the packet transmission frequency within the frequency sub-band.

Also in accordance with the present invention there is provided method of data collection in a multipoint to point data network having a number of fixed remote terminals each of which periodically wirelessly transmits data packets to one or more local collectors, in which each remote terminal transmits data packets in each of two frequency sub-bands.

Preferably the local collectors comprise a network of fixed collectors receiving data packets transmitted in one of the frequency sub-bands and one or more portable or mobile collectors receiving data packets transmitted in the other sub-band.

The present invention further provides remote terminals and data networks including such terminals, as defined in the attached claims to which reference should now be made.

Preferably each remote terminal transmits data packets in two frequency sub-bands and applies a pseudo-random frequency error to the packet transmission frequency within at least one of the two frequency bands. The frequency error is preferably applied for packets transmitted in the fixed collector sub-band and the fixed collector may suitably use dual Fast Fourier Transform algorithms to interpret simultaneous packets, on different error frequencies. A pseudo-random time delay, within a predetermined packet transmission interval, may also be applied to packet transmissions from the remote terminal to further reduce the probability of packet collisions and thereby increase the number of remote terminals which the collector is able to support.

The use of a single design of remote terminal, providing signals for both fixed and portable collectors, simplifies the system technology. Setting up the system is also simplified as it is not necessary to have installed a complete fixed collector infrastructure prior to start-up. The portable data collectors could provide coverage in those areas where fixed collector installation was incomplete or, due to low remote terminal density, uneconomic.

BRIEF DESCRIPTION OF FIGURES

A detailed description of a preferred embodiment of the present invention will now be given, by way of example only and with reference to the accompanying figures in which.

DETAILED DESCRIPTION OF FIGURES

Figure 1:
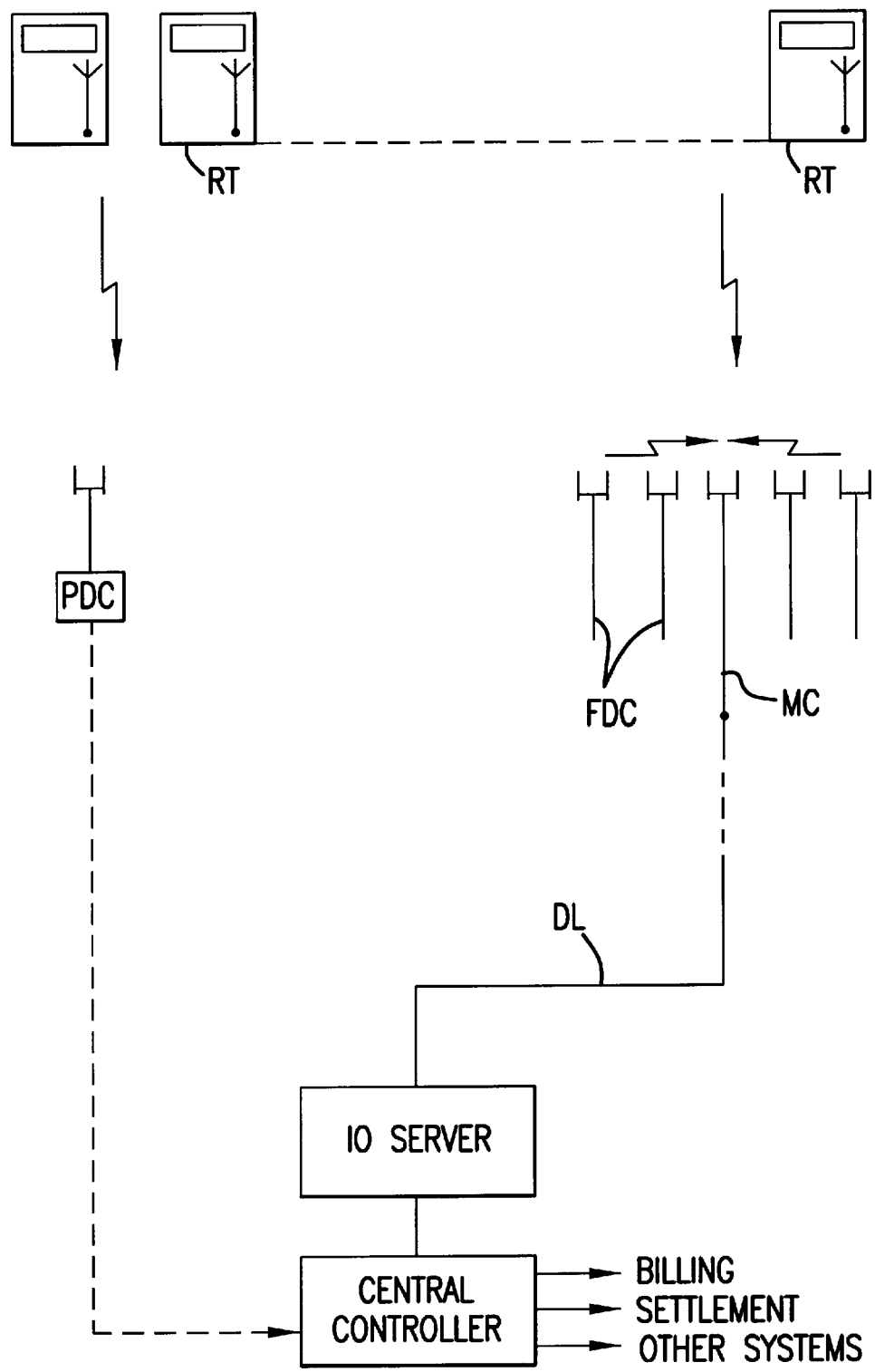
FIG. 1 shows schematically an arrangement of a remote terminal monitoring system embodying the present invention.

The general layout of the radiocommunications network in which the present invention is to be used may be as shown in FIG. 1, with remote terminals RT communicating with fixed local data collectors FDC by a unidirectional radio data link, and the local data collectors communicating with a master concentrator MC by a bi-directional radio link. Bursts of accumulated data are then sent on to a central controller via a data link DL. To provide coverage in cases where the density of remote terminals is low or the FDC network is not fully established, portable or mobile data collectors or concentrators PDC are provided. The remote terminals communicate with a PDC whenever it comes within range.

Data collected by the PDC is preferably transmitted directly to the central controller by downloading over a direct link on return of the PDC to base. Other methods may be possible, such as downloading by radio link, either directly to the central controller or to a master concentrator MC when one is in range.

Figure 2:
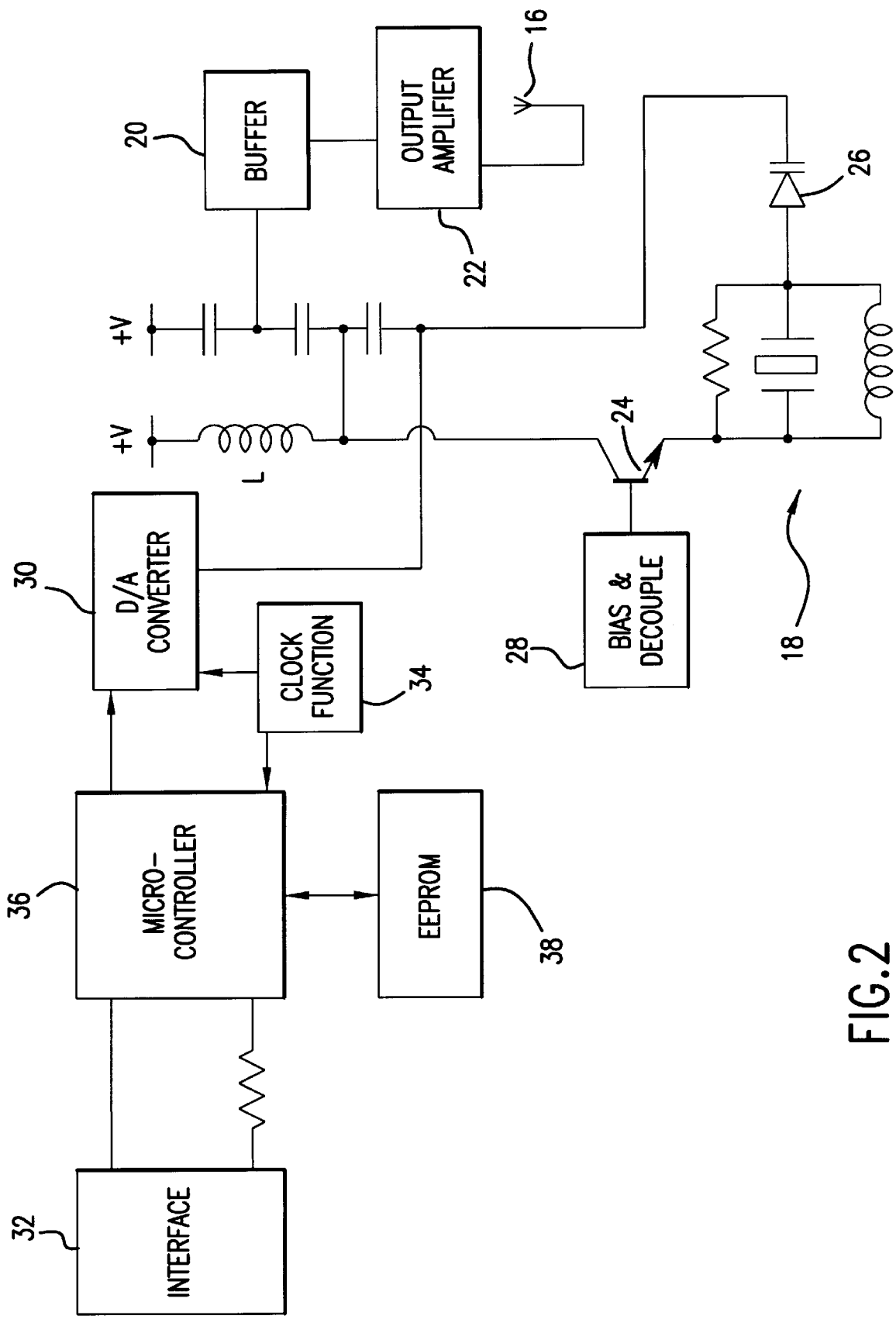
FIG. 2 is a block diagram of a remote terminal embodying the present invention.

FIG. 2 is a diagram of one of the remote terminals which consists of a radio transmitter 18, 20, 22 and associated antenna 16, a modulator circuit 24, 26, 28 driven by a D/A converter 30, an encoder 34, 36, 38 and a serial interface 32 to the device being monitored. The encoder is shown as a microcontroller 36, non-volatile (EEPROM) memory device 38 and clock function 34. The encoder performs encoder, frequency error and sub-channel selection and alignment functions as will be described.

The transmitter consists of three stages. The oscillator stage 18 comprises a Butler oscillator with a high overtone crystal which oscillates directly on the channel frequency. A buffer stage 20 is used to prevent 'pulling' by the power amplifier (PA) stage 22. The PA stage generates typically 100 mW which is used with an electrically small antenna 16 to produce a typical ERP of 10 mW. The antenna 16 is of conventional design and may be integral or external to the remote terminal. The transmitter is enabled or keyed by the clock or alignment functions.

The modulator varies the frequency of the oscillator in accordance with a voltage applied to it. A positive voltage is supplied to one side of the oscillator 18 from a positive supply via an inductor L and the collector-emitter path of a transistor 24. The base of the transistor 24 is provided with biasing and capacitive decoupling 28 in conventional manner. A varactor 26 connected to the other side of the oscillator 18 is reverse biased by the applied voltage. The oscillator is of such design that its frequency can be shifted over a wide range by the DC input to the modulator from the D/A converter 30. While transmitting data, however, the modulation index is constrained to be close to 0.5, producing a form of modulation known as Minimum Shift Keying (MSK).

The device being monitored transmits information to the remote terminal RT via interface 32 using either pulses or an encoded serial data stream at regular intervals. There are various standard formats that can be used for this purpose and they depend upon the type of device being monitored. In some devices the remote terminal can be manufactured as an integral part of the device.

Transmissions are triggered by the clock function 34. The rate at which transmissions are needed depends upon the type of data collecting concentrator. If the local concentrator is fixed (FDC) then the transmissions need only be relatively infrequent. A typical interval value might be once every 15 minutes. However a mobile or portable concentrator (PDC) will need to be close to the remote terminal to receive transmissions and they must be transmitted much more frequently to ensure reception during the limited time that the portable concentrator is within range. This time depends upon the speed of movement of the concentrator and could be less than a second. Accordingly, it is desirable to use a higher data rate for transmissions to the portable concentrator than those to a fixed concentrator.

Transmitted data packets contend with each other for access to the radio channel. In order to maximize channel capacity it is desirable to make the probability of a packet transmission in every time instant within each interval equal by using a pseudo-random algorithm to choose the transmission instant within the time interval. The clock function 34 triggers the encoder 36 once per interval and indicates whether the transmission is intended for a fixed concentrator or a mobile/portable concentrator.

The remote terminal's encoder function stores the relevant received data from the monitored device. The encoder function codes the relevant data into a suitable form and outputs it to the frequency error select function when requested by the clock 34. The encoder function may encipher certain key parameters. A serial data packet is formed and additional information is added to ensure adequate timing recovery and framing in the receiver. The encoder codes the data in predetermined manner, such as encoding for forward error correction using either a block or convolutional encoding algorithm. The serial data for transmission may then be further differentially encoded to assist the detection of data in the receiver and output to the frequency error select function.

The frequency error select function takes each binary bit of the encoded data packet and turns it into a word which is written to the D/A converter 30. For each data packet a binary '1' is represented by a word of one value and a binary '0' is represented by a word of a differing value. The output of the D/A converter 30 is a voltage waveform which has one value representing binary '1' and another value representing binary '0'. This waveform is applied to the modulator. The difference in voltage between the '1' and the '0' voltages and between them both and the voltage which represents an unmodulated carrier is under the control of the sub-channel select function. This is dependent upon the words chosen to represent the '1' and the '0'.

If the data packet to be transmitted is intended for a mobile or portable system then the sub-channel select function will select a pair of words such that the DC component of the modulating waveform shifts the mean frequency of the oscillator during the packet transmission to its maximum extent below the nominal frequency. This offset from the mean is such that the receiver used by the fixed data collectors can provide sufficient adjacent channel selectivity to operate without interference from the very frequent transmissions intended for the mobile or portable data collectors by effectively dividing the channel into two frequency sub-bands.

If the data packet to be transmitted is intended for a fixed data collector then the frequency error select function will select a pair of words such that the mean frequency of the oscillator during the packet is chosen by a pseudo random process such that all frequencies within a designated channel are equally likely. FIG. 3 shows the frequency plan in more detail.

Figure 3A:
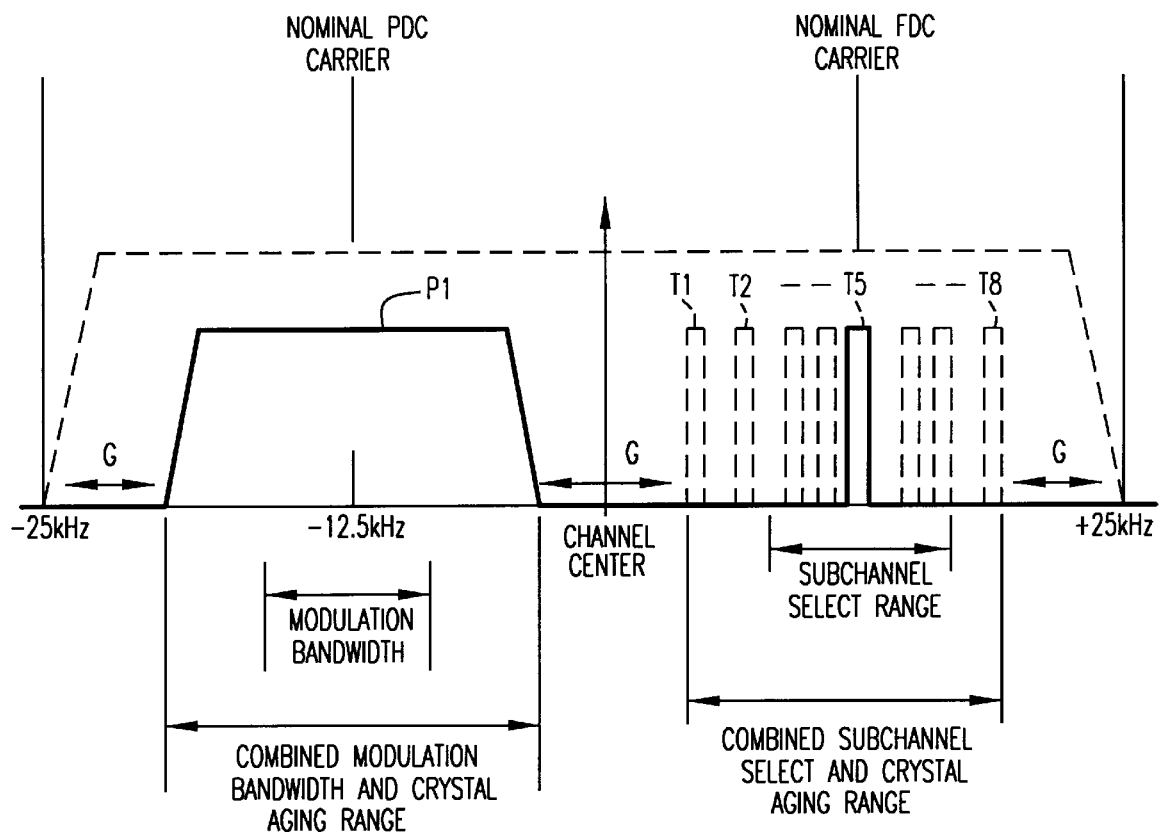
FIG. 3a shows frequency plans for a monitoring system embodying the present invention.

A typical allocated channel is 50 kHz wide. As shown in FIG. 3A, the effect of the sub-channel selection function is to effectively divide this into upper and lower 25 kHz sub-bands for the fixed and portable data collectors respectively, with the respective nominal carrier frequencies at the center of each sub-band. The frequency error select function applied for packet transmissions to fixed data collectors results in the packet mean oscillator frequency having a sub-channel select range about the upper nominal carrier as shown. Extended ranges, separated by guard bands G, have to be allocated to allow for crystal aging and temperature stability giving a combined sub-channel aging and select range for the upper (FDC)sub-band or sub-channel. A typical data rate for the fixed network transmissions is 1.2 kbit/s. With MSK modulation the transmitted packet bandwidth is less than 2 kHz. As will be described, in a fixed receiver for the system simultaneous transmissions within the channel(indicated as T1 to T8 in FIG. 3A) can be both resolved if sufficient frequency error difference exists.

Figure 3B:
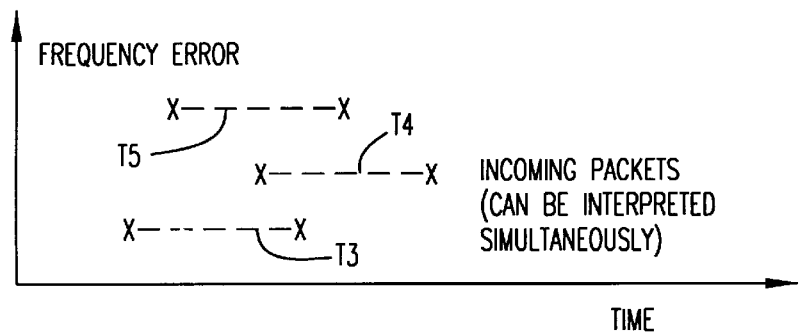
FIG. 3b plots frequency errors versus time

As shown in FIG. 3B, the general case will be that both the frequency error (frequency offset relative to the nominal carrier frequency) and start of transmission will differ for packets from separate remote terminals such as to allow a large number of remote terminals to be monitored by a single local fixed collector.

A typical data rate for transmissions in the lower (PDC) sub-band is 6 kbit/s, MSK. Because of the higher spectral occupancy due to the increased data rate (which may be seen by comparision of the bandwidth for a single packet transmission in the PDC sub-band (P1) and the FDC sub-band (T5)) frequency error selection is not used in the PDC 25 kHz sub-band.

With the simple, low cost type of transmitter described the relationship between modulation voltage and frequency shift is non-linear. When the unit is being manufactured the alignment function receives commands from the device interface to vary the modulation voltage and the frequency error is measured by external test equipment. For each remote terminal its resulting calibration data is stored in non volatile memory 38 within the unit. This procedure eliminates manual tuning of the transmitter circuit during manufacture. When the frequency error required has been chosen by the frequency error function, reference to the calibration data enables the correct word values to be chosen to maintain the modulation index close to its nominal value of 0.5 for MSK.

Figure 4:
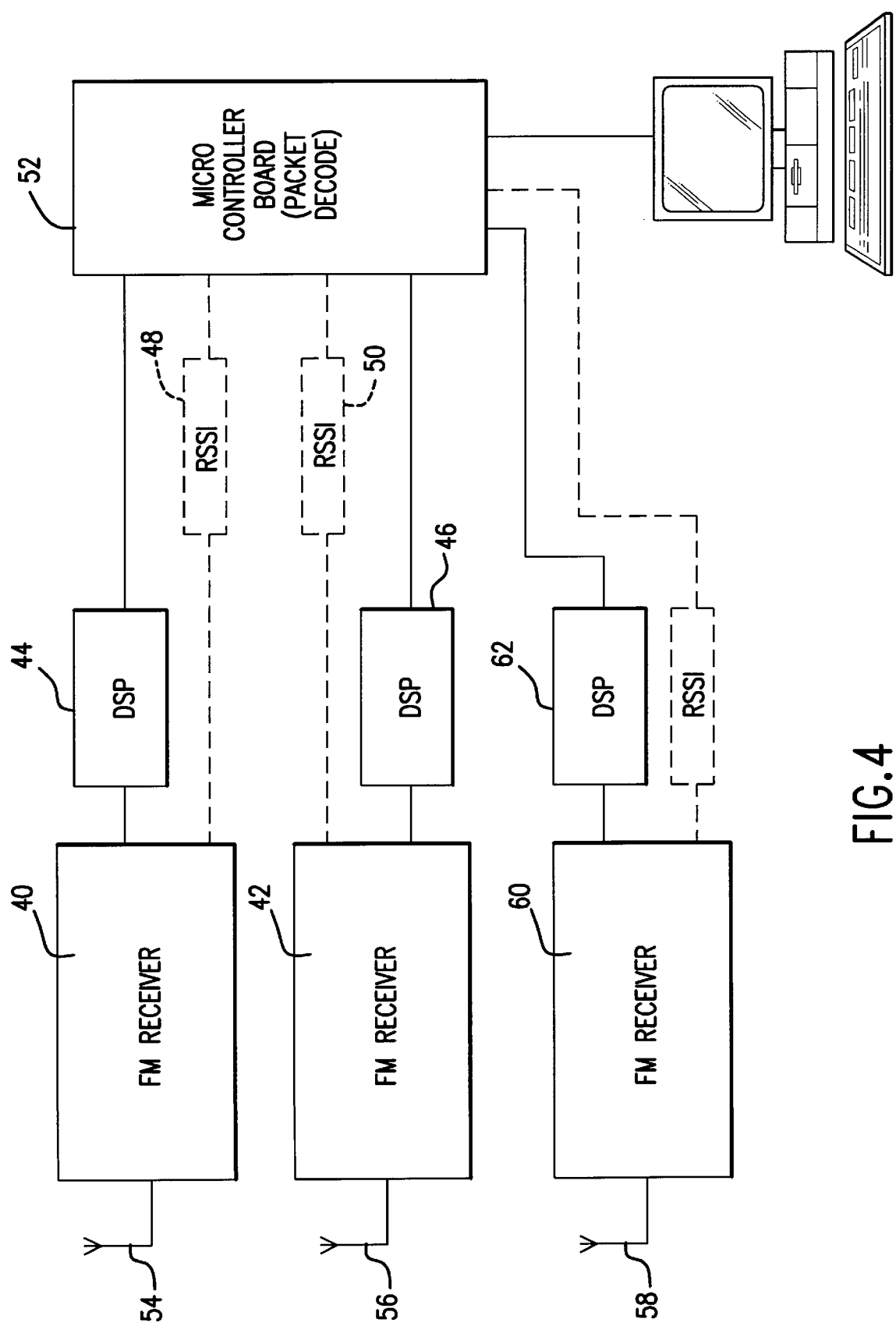
FIG. 4 is a block diagram of a fixed receiver for use with terminals as in FIG. 2.

A diagram of the fixed data collector receiver unit is shown in FIG. 4. It consists of a pair of single channel FM radio receivers 40, 42, each with an associated digital signal processing stage 44, 46. The output of the two digital signal processing stages 44, 46 is supplied to a packet decoder 52 which includes an interface to the rest of the data collector unit (represented in the figure by computer PC). Received signal strength indicators RSSI 48, 50 may optionally be included between the receivers 40, 42 and packet decoder 52.

Two antennae 54, 56 of conventional design are used. One antenna 54 is optimised for the reception of horizontally polarized signals and the other 56 is optimised for the reception of vertically polarized signals. At certain sites, typically coastal, a third directional antenna 58 is used pointed so as to obtain maximum signal level from a broadcast interferer. Broadcast interferers which may affect the system if not corrected for include, at coastal sites in the United Kingdom, French and Irish television broadcast signals which are transmitted in the frequency band set aside for remote monitoring systems in the United Kingdom.

As shown, the third antenna 58 is connected to the packet decoder 52 via an FM receiver 60 and digital signal processing stage 62. The deliberate reception of broadcast interferers allows cross-correlation with the incoming signals on the horizontal and vertical antennae 54, 56 to auto-null the interfering component. While shown as separate units, it will be understood that digital signal processing stages 44, 46, 62 may be formed as a single unit. This latter implementation is envisioned for a practical arrangement of the system.

Figure 5:
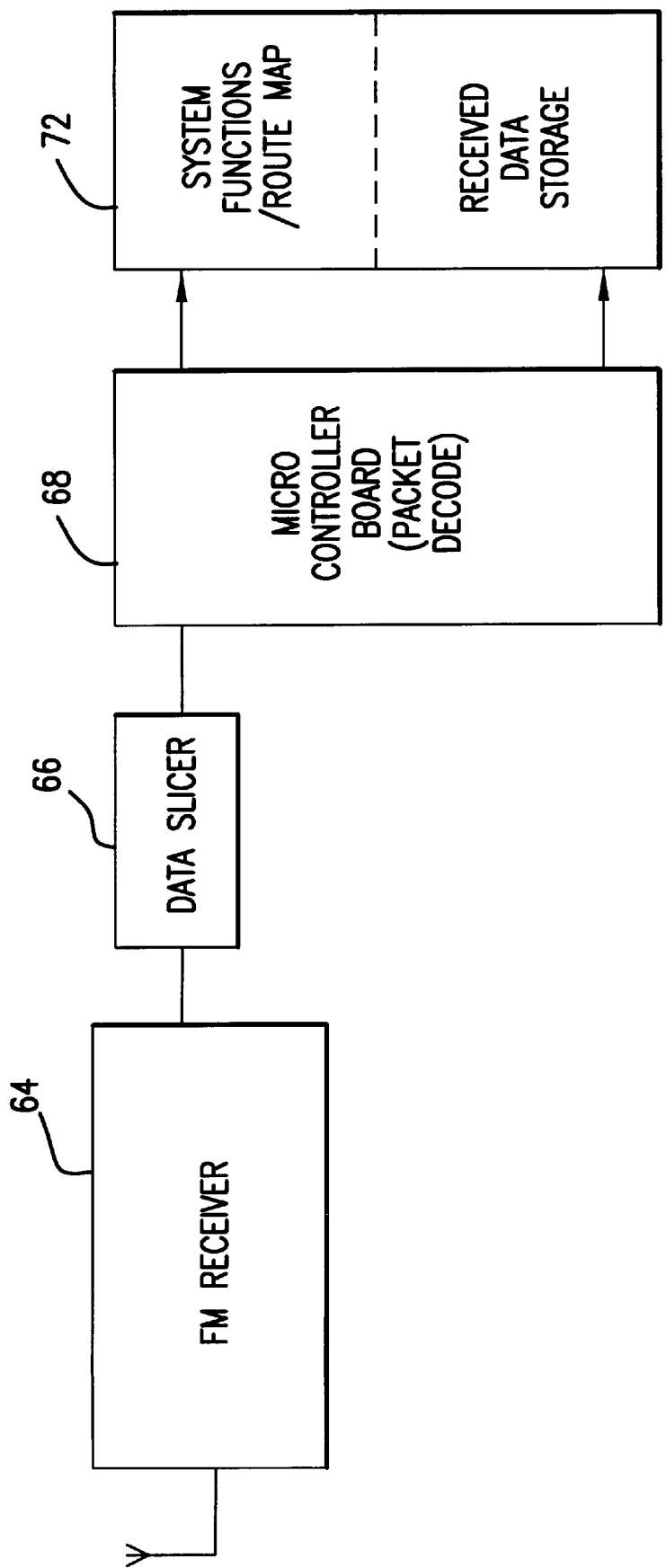
FIG. 5 is a block diagram of a portable receiver for use with terminals as in FIG. 2.

A diagram of the portable data collector receiver unit is shown in FIG. 5. Comparison with FIG. 4 will show that the portable unit is far simpler than the fixed, comprising only a single antenna 70, FM radio receiver 64, and data slicer 66 supplying a packet decoder 68. The coverage area for the portable unit is much smaller than for the fixed data collector and the number of competing data packets greatly reduced. Accordingly, the cost and complexity of digital signal processing circuitry may be avoided. The packet decoder 68 includes an interface to the remaining parts of the portable unit, indicated generally at 72, which include storage for received data and information as to the route to be taken by the unit to obtain readings from particular remote terminals.

Many data collectors will be well sited often at existing radio sites used by telephone, pmr (private mobile radio) and broadcast operators. We have recognized that, unlike many simple receivers, it is therefore necessary to provide high levels of immunity to blocking by interfering signals and a high level of image rejection. This performance is conventionally provided by dual conversion superheterodyne receivers. The two intermediate frequencies (IFs) used by such receivers mean that two image frequencies are produced. The rejection of each depends almost entirely on the filter rejection of this image immediately prior to the down conversion.

Figures 6, 7:
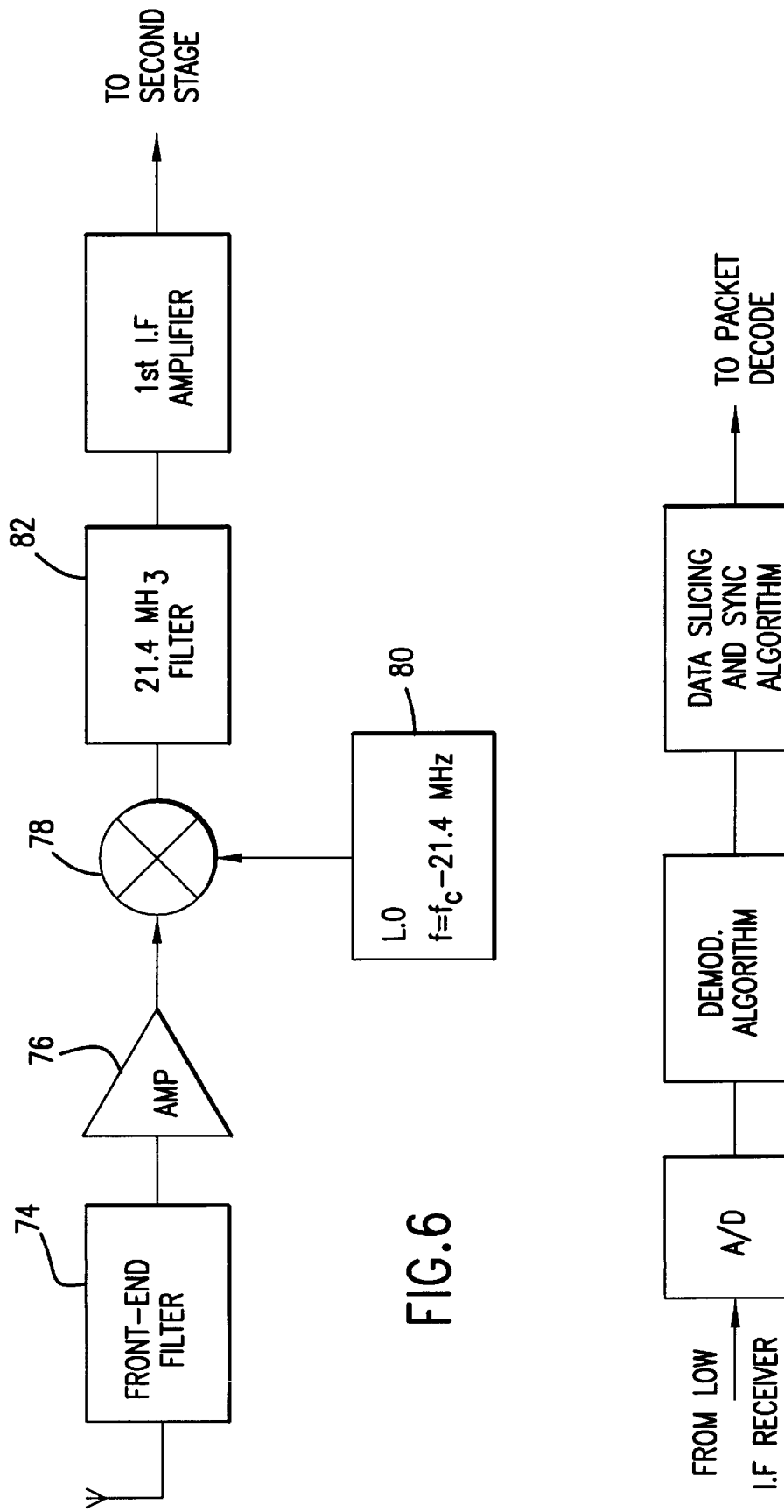
FIG. 6 shows the first stage of the receiver of FIG. 4 in greater detail.
FIG. 7 schematically illustrates a digital signal processing stage for the receiver of FIG. 4.

The first stage of our receiver design, shown in greater detail in FIG. 6, is the first stage of such a conventional receiver. A low noise front end stage (not shown) precedes a band limiting filter 74 for the allocated frequency band. Following amplification 76 the filtered signal is mixed 78 with a signal from a first local oscillator 80 which differs from the desired carrier frequency by a difference equal to the first IF. This first IF is typically 21.4 MHz in a VHF or UHF receiver. A crystal filter 82 receives the mixed signal and is used to provide selectivity at 21.4 MHz. The image frequency is located 42.8 MHz away from the wanted carrier and signal energy at this frequency is sufficiently attenuated by the band limiting filter 74.

In a conventional dual conversion superheterodyne receiver there is a second conversion process where the filtered output from the first stage is mixed with a further local oscillator. This differs from the first IF frequency by the desired second IF frequency. A typical value that is often chosen for the second IF is 455 KHz. Any second image will hence be 910 KHz away from the wanted signal. The filter in the preceding stage at 21.4 MHz will then sufficiently attenuate the signal energy at this frequency.

However in the fixed receivers used in this communication network, further diversity combining, filtering, interference cancellation detection and decoding is carried out using digital signal processing (DSP) techniques as shown in FIG. 4. These require that the analog signal output from the second stage of the receiver is sampled and converted in an analog to digital converter (A/D). It is known from Nyquist that the sampling frequency must be greater than or equal to twice the highest frequency component in the analog signal. In addition, in a practical system, allowance must be made for the realization of an anti-aliasing filter. With the standard dual conversion superheterodyne receiver we could anticipate sampling the waveform at a rate close to 1 MHz.

A minimum configuration of DSP is illustrated in FIG. 7. The prime function of the DSP is to detect the start of each packet and to measure the packet transmission frequency error (or offset), and then to optimally filter the packet with the minimum bandwidth consistent with coherent DMSK data detection to realize a maximum signal to noise gain. To this end, the DSP performs various digital algorithms to improve the analog waveform at the receiver output to enhance the capacity of packets interpreted and improve the sensitivity by rejecting noise and interference to the maximum extent. Tolerances on the meter transmitters may also be reduced or eliminated.

A list of functions which the DSP can perform in order of increasing complexity is given below. The simpler DSP algorithms would perform the topmost functions only. The more complex implementations would go further down this list:

1. Single bit time delay for certain modulation schemes.
2. Signal filtering for optimal rejection of white noise. This may be done by an FFT (Fast Fourier Transofrm).
3. Dual FFT to enable continuous processing of incoming packets, particularly detection of start of packet.
4. Demodulation of DMSK, MSK or DPSK schemes.
5. Correction for tolerances on modulation index of transmitter.
6. Viterbi decoding in order to achieve optimal signal to noise i.e. equivalent to coherent detection of PSK.
7. Viterbi decoding linked with convolutional encoding of the transmitted packets.
8. Interference cancellation of foreign television signals within the bands.
9. optimize capture effect of meter transmission packets.
10. Data synchronisation, clock extraction and tracking.
11. Decoding, error detection, correction.

Given that the receiver DSP performs a frequency measurement to determine the packet transmission frequency error and that it can identify the particular meter and attach this frequency error to it, an important performance improvement can now be achieved if it is desired to upgrade the system for two way operation.

It is anticipated that in such an upgrade, a narrow band direct conversion receiver could be implemented in the transmitter employing the transmitter oscillator as its local oscillator (LO). Since for a short time interval (eg 15 minutes) after the DSP in the central receiver has measured this frequency error, the meter crystal drifts are likely to be very low, the meter receive frequency for the downlink will be highly accurately known. A bandwidth of 2 KHz or less could be employed to receive uplink messages. A useful two way link can be established where data in the downlink is sent following packet initiation and frequency measurement in the uplink. The downlink meter receiver may be low complexity but provide a very good link budget which makes the downlink workable with low power central station transmitters. The present regulations only allow 10 mW for central station transmitters within the 184 MHz band.

The two way protocol used in this system will be different from a conventional one where meters are "woken up" or initiated by a packet from the central station through a downlink. Here initiation and frequency measurement must be initiated in the uplink before downlink communication can commence. However, a regular measurement of the link, say every 15 minutes, may keep the two way link continuously operational, in which case a more conventional protocol could be used, with the possibility of reduced latency in the downlink.

In order to reduce the cost and complexity of the DSP it would be desirable to be able to sample the receiver second stage at a much lower rate. However, if we reduce the second IF from 455 KHz to say 20 KHz then the image frequency will now only be 40 KHz away. Signal energy on the image frequency will no longer be sufficiently attenuated by the first IF filter and poor receiver performance will result.

In the present design the receiver 2nd IF stage of the conventional superheterodyne receiver is replaced directly by an image cancelling receiver circuit. A number of these circuits are known. They are used as stand-alone receivers of a low cost type in applications such as portable FM radios and radio paging receivers. On their own they do not meet the performance criteria associated with a base station dual conversion design. However their use in this design with a preceding superheterodyne stage allows satisfactory performance to be obtained. Four such image cancelling circuits are in common use. These are:

(a) the Frequency Lock Loop (FLL) receiver;
(b) the Offset Homodyne receiver;
(c) the Direct Conversion receiver;
(d) quadrature mixer and quadrature addition, and
(e) use of a first IF crystal filter 82 (FIG. 6) with a selection null corresponding with the image frequency (crystal filters for 10.7 or 21.4 MHz can be selected which exhibit a null near the pass band when the 2nd IF is low and suitably selected).

The IF can be dramatically lowered, (or—if the circuit type is direct conversion—eliminated) as the image response is no longer a problem. This means that the sampling frequency for the analog to digital conversion can also be dramatically reduced and the computational load on the DSP processor greatly reduced. Examples of image cancelling circuits (a)–(d) are shown in FIGS. 8 to 11 respectively.

Figure 8:
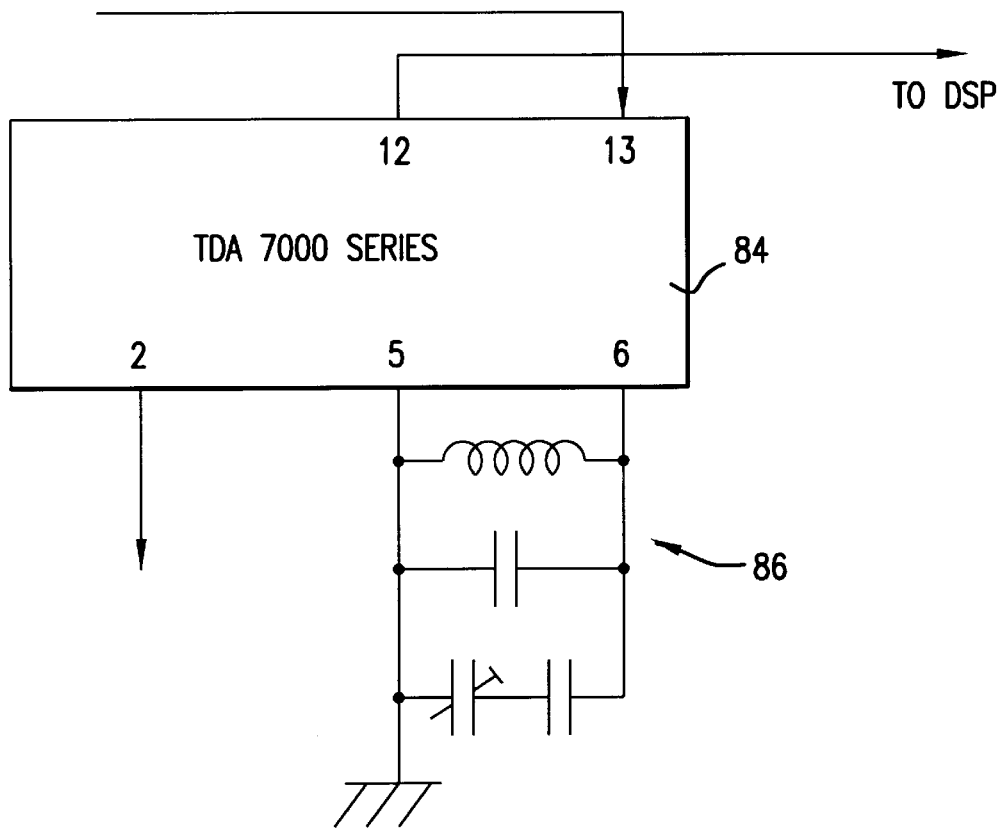
FIGS. 8 to 11 shows four configurations of image canceling circuit for use with the receiver of FIG. 4.

As shown in FIG. 8, the FLL receiver may be an integrated circuit 84. Integrated FLL receivers are widely available at low cost. One example is the Phillips TDA 7000 broadcast receiver with a minimum of external components—in the present case a simple oscillator circuit 86 operating at the nominal IF frequency of 21.4 MHz.

Figure 9:
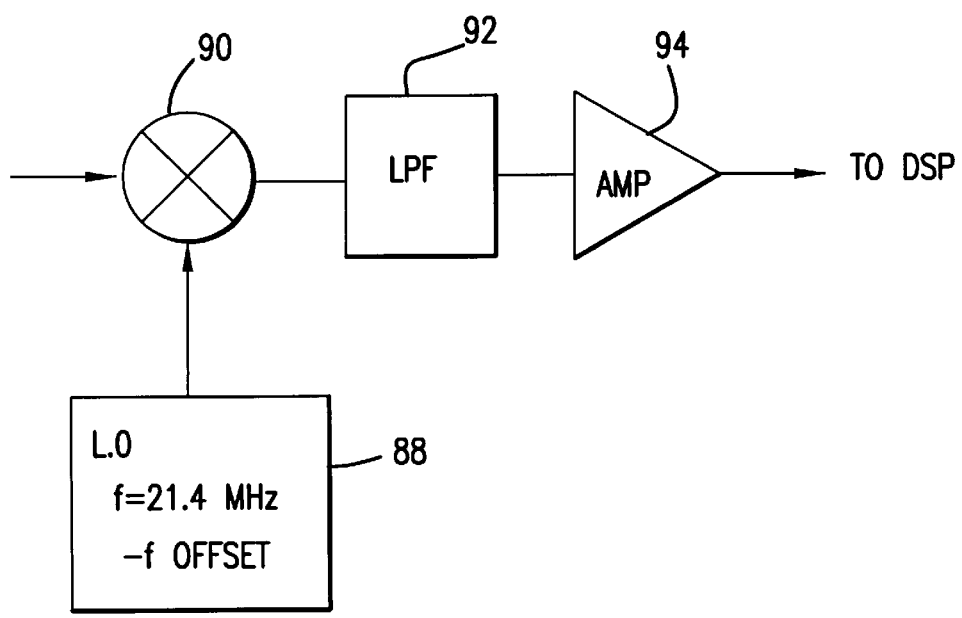

The offset homodyne receiver of FIG. 9, operating on a 25 KHz sub-channel, receives the 21.4 MHz IF signal from the first stage (FIG. 5). A local oscillator 88 generates a signal having a frequency which differs from the first IF by a small amount ($f_{offset}$), suitably 5 KHz. The signal from the oscillator 88 is then mixed at 90 with the first IF signal, low-pass filtered at 92 and amplified at 94 for supply to the DSP stage.

Figure 10:
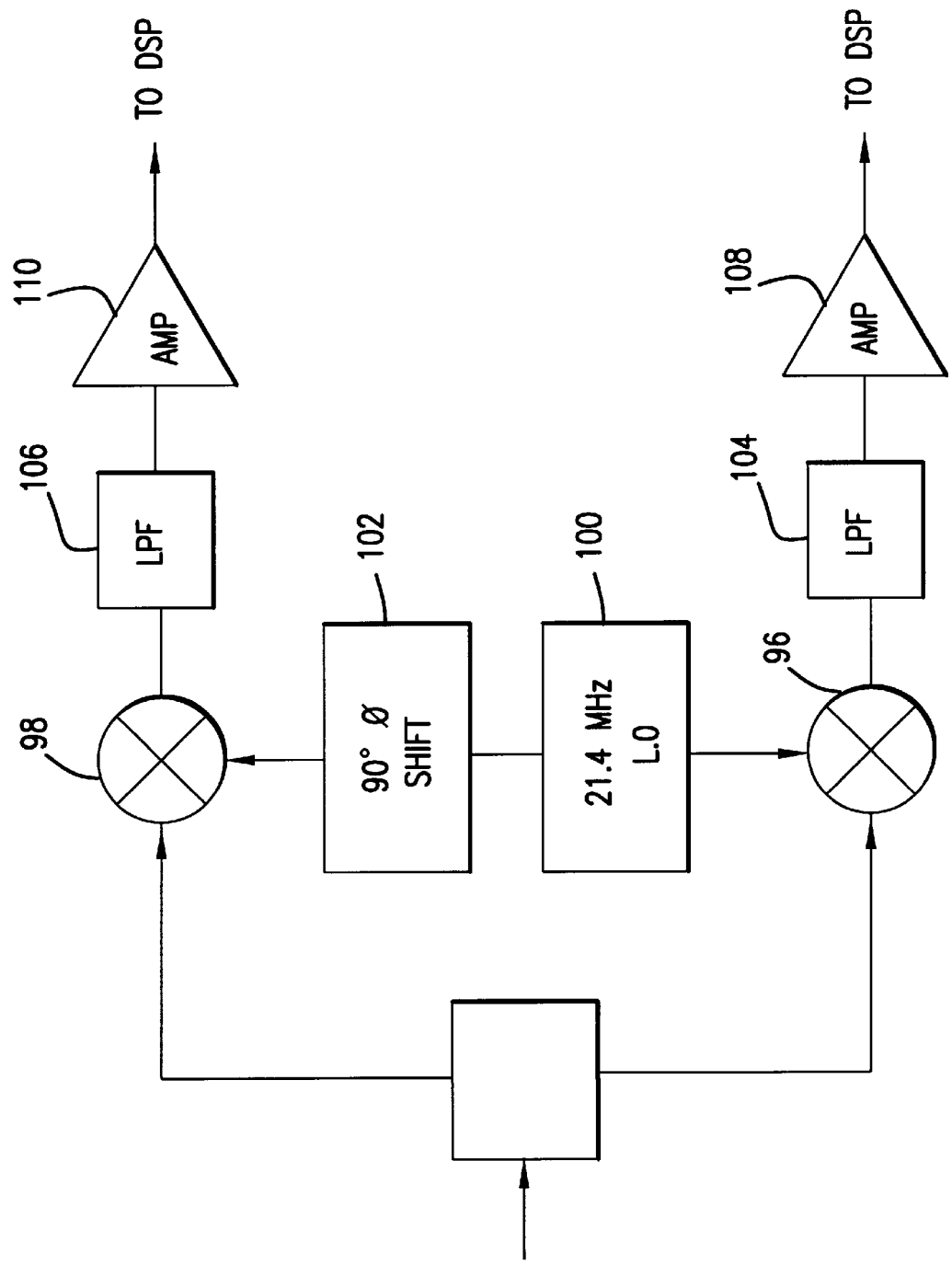

In the direct conversion receiver of FIG. 10, the received first IF signal is supplied to first 96 and second 98 mixers. A local oscillator 100 generates a signal equal to the first IF signal frequency and supplies this direct to the first mixer 96. The oscillator signal is also supplied, following a 90° phase-shift 102, to the second mixer 98. Each mixer output is then low-pass filtered at 104, 106 and amplified at 108, 110 prior to supply to the DSP stage.

Figure 11:
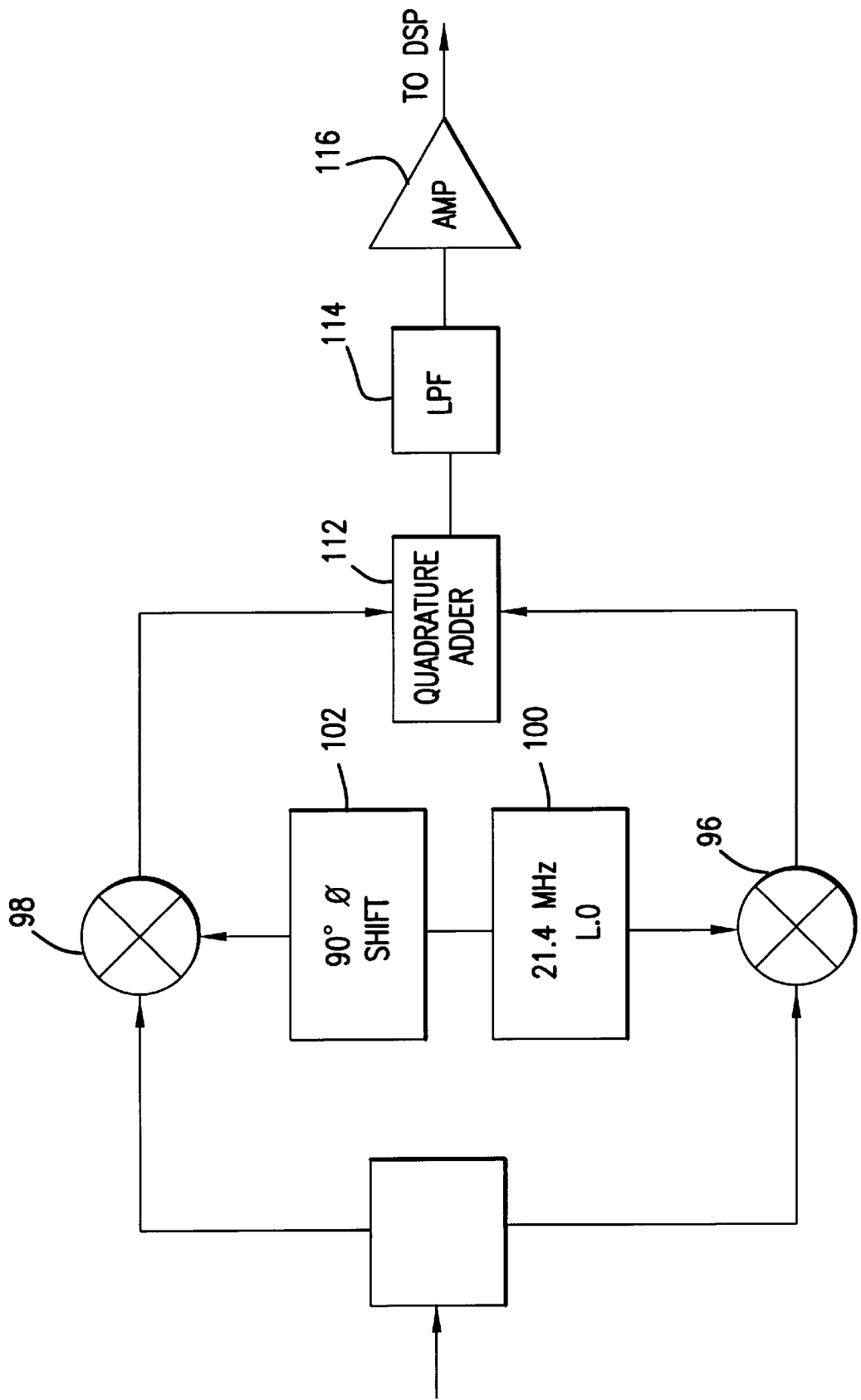
Figure 12:
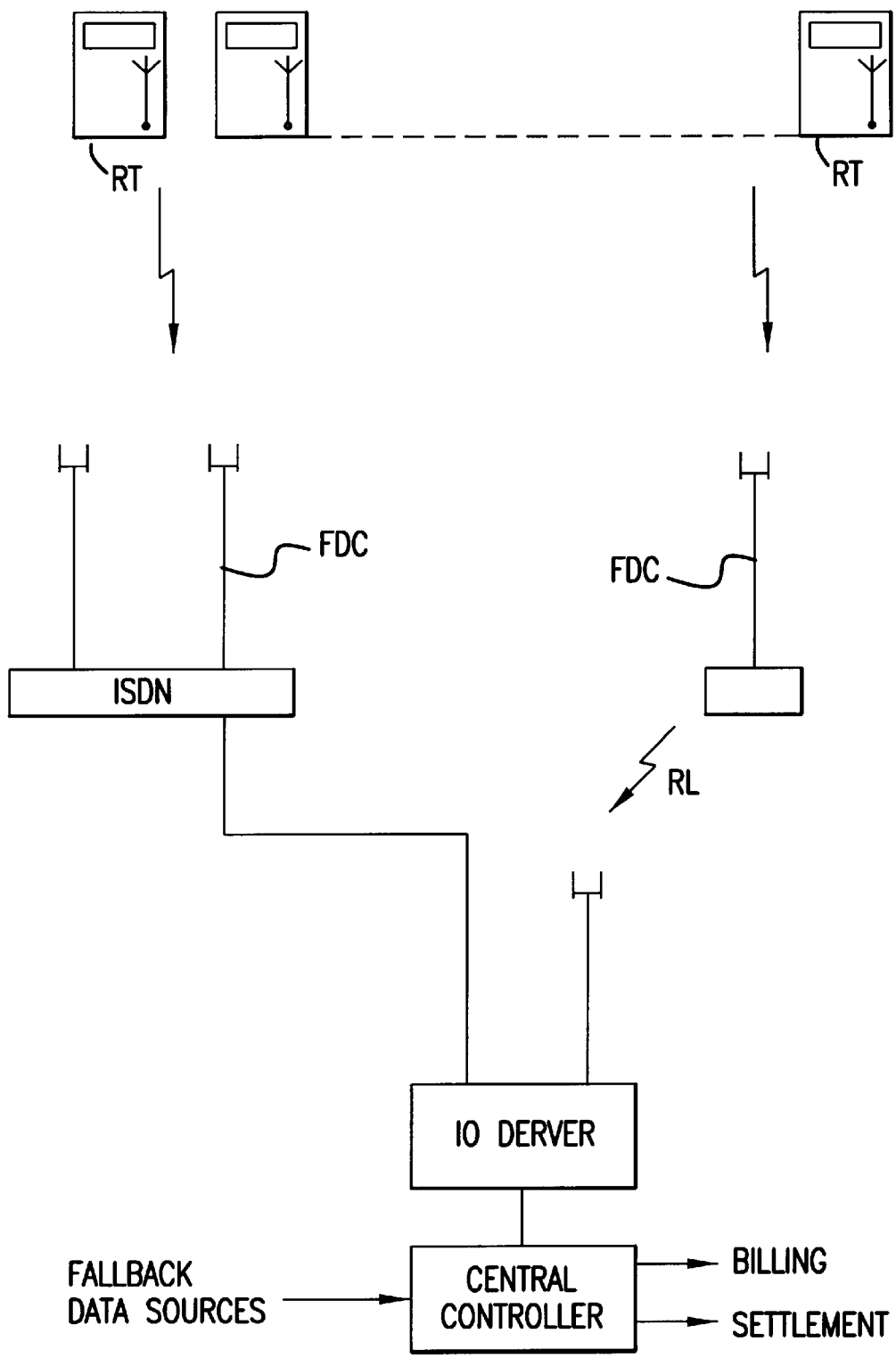
FIG. 12 shows schematically a typical arrangement of a remote terminal monitoring system as already described.

The quadrature mixing and addition circuit of FIG. 11 is similar to the direct conversion receiver save in that, rather than providing two inputs to the DSP stage, the outputs of the first and second mixers 96, 98 are added together by a quadrature adder 112. The single output from the adder is then filtered at 114 and amplified at 116 for supply to the DSP stage.

We claim:

1. Remote terminal apparatus for use in a multipoint to point data network, the apparatus comprising:
    a data encoder operable
        to receive a stream of data for radio frequency transmission within a given frequency channel, and
        to encode the said data into packets, and
        to divide said frequency channel into upper and lower frequency sub-bands and to select a frequency sub-band within the frequency channel, and
    a variable frequency transmitter operable
        to periodically transmit the data packets and
        to apply a pseudo-random frequency error to the packet transmission frequency within said frequency sub-band, in which the transmitter is operable to vary the pseudo-random frequency applied for each successive data packet such that the variation in pseudo-random frequency being chosen ensures that substantially all frequencies within said frequency sub-band are equally likely and so as to maximize channel capacity where the remote terminal apparatus is capable of two different transmissions, one via fixed data collectors and another via portable data collectors.

2. Remote terminal apparatus as claimed in claim 1 in which the variation in the pseudo-random frequency is chosen taking into account natural randomizing factors such as aging and temperature variations.

* * * * *